E. W. DAVIS.
ELECTRIC BLASTING MACHINE.
APPLICATION FILED SEPT. 28, 1914.
1,209,267.
Patented Dec. 19, 1916.
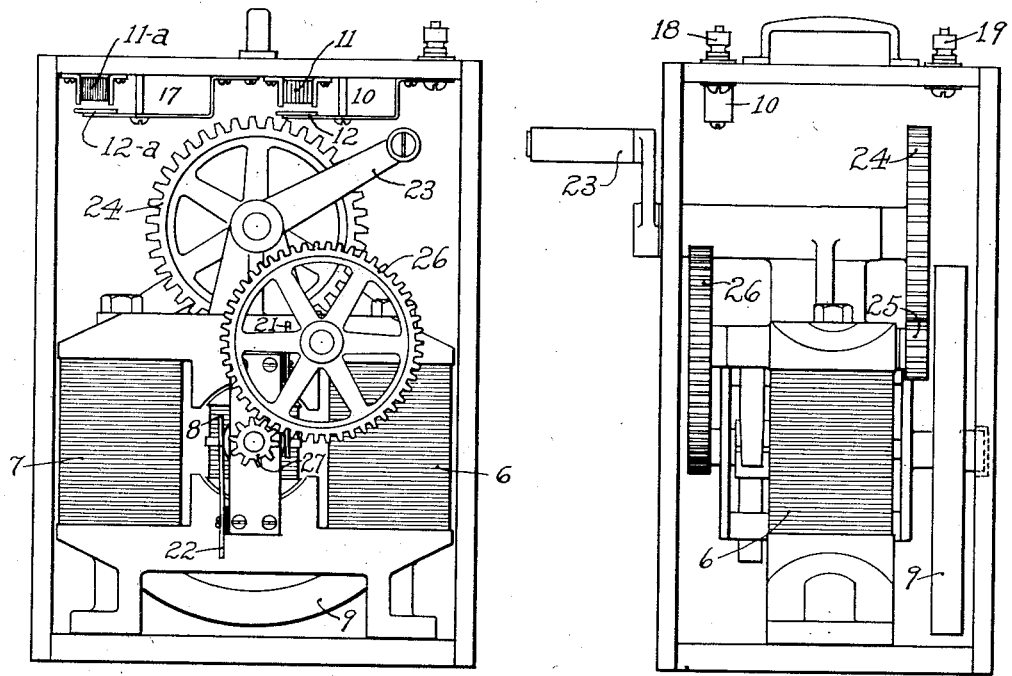
*Fig. 1*  *Fig. 2*
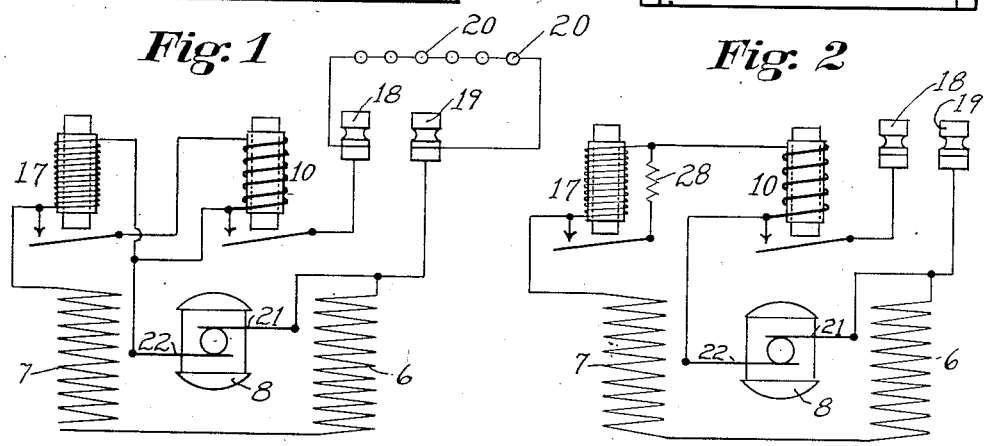
*Fig. 3*  *Fig. 4*
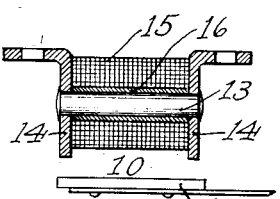
*Fig. 5*
WITNESSES:
INVENTOR:
Ernest W. Davis

UNITED STATES PATENT OFFICE.

ERNEST W. DAVIS, OF CHICAGO, ILLINOIS, ASSIGNOR TO THE AETNA POWDER COMPANY, OF CHICAGO, ILLINOIS, A CORPORATION OF INDIANA.

ELECTRIC BLASTING-MACHINE.

1,209,267.

Specification of Letters Patent.

Patented Dec. 19, 1916.

Application filed September 28, 1914. Serial No. 863,968.

*To all whom it may concern:*

Be it known that I, ERNEST W. DAVIS, a citizen of the United States, and a resident of the city of Chicago, in the county of Cook and State of Illinois, have invented a new and Improved Electric Blasting-Machine.

This invention relates to electric generators, particularly to those employed for the purpose of firing blasts by electricity.

The object of this invention is to provide a machine of the class described which shall be more efficient and dependable than prior devices.

This invention comprises a dynamo having an armature and an electro-magnetic field with one or more relays for the purpose of altering the circuit when certain conditions in the speed of the armature and magnetic intensity of the field occur.

One relay which will be designated hereinafter as the line relay is connected in the circuit in such manner that the current generated in the armature of the dynamo is shunted through an external circuit when the line relay is sufficiently energized. The other relay which will be known hereinafter as the field relay is connected with the field winding of the dynamo. When this field relay is sufficiently energized it closes and thereby decreases the resistance in the field circuit. It has been found advantageous to surround the cores of both line and field relays with inductive conductors for the purpose of delaying the release of these relays as will be explained more fully hereinafter.

The armature shaft of the dynamo is preferably supplied with a fly wheel for the purpose of maintaining the speed of the armature when the field relay is closed. The closing of the field relay causes an increase in the magnetic intensity of the field which produces a sudden increase in the load, and it is for the purpose of supplying power for this sudden increase in load that the fly wheel is supplied.

The preferred embodiment of my invention is illustrated in the accompanying drawings in which—

Figure 1 is a front elevation of the complete machine showing the dynamo and both line and field relays. Fig. 2 is a side elevation and shows the dynamo with the fly wheel on the armature shaft. Fig. 3 is the preferred system of wiring. Fig. 4 is a modification of the wiring shown in Fig. 3. Fig. 5 is the line relay, which is the same as the field relay except that the field relay is wound with finer wire.

The dynamo comprises a field having field windings 6 and 7 and an armature 8. The armature shaft is provided with a fly wheel 9, which is preferably of large diameter in order that its moment of inertia shall be great enough to carry the temporary load while the machine is discharging at its greatest capacity.

The line relay 10 comprises a magnet 11 and armature 12 (Fig. 1). The magnet 11 consists of a core 13, (Fig. 5) having paramagnetic end pieces 14 and a winding 15. Contact is made between the end pieces 14 and the armature 12, both of which are connected in the circuit in the manner illustrated in the wiring diagram Fig. 3.

In the wiring diagrams, (Figs. 3 and 4) which are purely diagrammatic, relays of the conventional type are shown having contacts separate from the cores. They are shown in this manner for the sake of clearness and in order to facilitate tracing the circuit. The specific construction of the relays is that shown in Fig. 5. The core 13 is surrounded by an inductive conductor which consists of a copper tube 16. Any decrease in the magnetism of the core 13 induces a current in the copper tube 16, and this induced current is in such a direction that it tends to maintain the magnetism of the core 13. This produces a delayed action of the relay 10 and improves the action of the machine for reasons which will be described hereinafter. The field relay 17 is identical with the line relay 10, except that the wire helix is of finer wire and contains a greater number of turns. Binding posts 18 and 19 are provided for the purpose of making connections to the external circuit which in ordinary practice consists of several electric detonators 20 connected in series (Fig. 3).

The operation of the machine is as follows: The armature 8 is revolved by means of the crank 23 and gearing 24, 25, 26, 27 shown in Figs. 1 and 2. A very weak current is thus produced which passes from the brush 21 (Fig. 3) through the field windings 6 and 7 and field relay 17 back to the brush 22. The resistance of the field relay 17 is very high, so that very little energy is required to revolve the armature 8 while the field relay 17 is open, but as the rotation of the armature 8 is gradually accelerated the E. M. F. is gradually increased and when the proper speed is reached the field relay 17 is closed. The E. M. F. then increases very rapidly until the line relay 10 closes, thus allowing the current to pass out over the line and fire the detonators 20. During the interval between the closing of the two relays the load on the dynamo is very strong and in a large machine it would be impossible for a man of ordinary strength to turn the crank 23 fast enough to maintain the necessary speed, but the fly wheel 9 by virtue of its momentum continues to revolve the armature at a very slight decrease in speed until the line relay 10 has closed and until electric detonators 20 have been fired. With this machine a man of ordinary strength can produce a current of 800 watts, or over one horse-power. This is due to the fact that energy is supplied for a considerable length of time and stored in the fly wheel and later converted into electrical energy during a much shorter period of time.

The construction of the relay shown in Fig. 5 is particularly adaptable to this invention. As the armature 12 approaches the end pieces 14 the attraction increases, and when these parts are in contact a comparatively weak current in the relay winding is sufficient to hold them in contact. For this reason the induced current in the copper tube 16 is sufficient to hold the armature 12 in contact with the end pieces 14 for a small period of time, even when the current flowing through the winding 15 has ceased. It has been found by actual practice that a relay without the inductive conductor 16 causes a chattering motion of the armature 12 which makes the operation of the machine uncertain.

In the wiring diagram illustrated in Fig. 4 a low resistance 28 is placed in a circuit in such manner that it is shunted across the field relay 17 when the field relay is closed. The machine wired in this way is just as dependable in its action as a machine wired according to the diagram shown in Fig. 3, but it is not quite as efficient because there is a slightly greater resistance in the field circuit.

The field relay 17 can be permanently closed and the machine will still be operative, provided sufficient power is applied to rotate the armature when the resulting heavy current is flowing through field windings. Obviously in a very small machine, sufficient power can be applied by hand to revolve the armature with the field fully magnetized, and in machines designed to fire but a few detonators the field relay 17 may be omitted.

In the improved machine which has been described the discharge has more of the nature of a direct current, the drop in potential being comparatively slow and the duration of the discharge comparatively long. Prior attempts to use a current taken directly from an armature of a dynamo have been unsuccessful in large, hand operated machines because of the limited power that can be obtained by turning a crank, but in the device of this invention the power is supplied for such a long time relative to the time during which the discharge takes place, that it produces a stronger current that machines of the inductive discharge type.

In the device of this invention the discharge through the external circuit cannot occur until the machine is working at its greatest capacity. The advantage of this action will be apparent to any one familiar with blasting operations.

I claim:

1. The combination with a dynamo comprising an armature and an electro-magnetic field, of a line relay energized by current from said dynamo and connected in such manner that the current generated by said armature is shunted through an external circuit when said line relay is sufficiently energized, the core of said line relay being surrounded by an inductive conductor whereby the release of said line relay is delayed, thus prolonging the discharge through said external circuit.

2. The combination with a dynamo comprising an armature and an electro-magnetic field, of a line relay connected in such manner that the current generated by said armature is shunted through an external circuit when said line relay is sufficiently energized, and means for automatically decreasing the resistance of the field circuit of said dynamo when said armature has attained a given speed.

3. The combination with a dynamo comprising an armature and an electro-magnetic field, of a line relay connected in such manner that the current generated by said armature is shunted through an external circuit when said line relay is sufficiently energized, and a field relay connected with the field winding of said dynamo and arranged to decrease the resistance of the field circuit of said dynamo when said field relay is sufficiently energized.

4. The combination with a dynamo comprising an armature and an electro-magnetic field, of a line relay connected in such manner that the current generated by said armature is shunted through an external circuit when said line relay is sufficiently energized, and a field relay connected with the field winding of said dynamo and arranged to supply current to said line relay when said field relay has been sufficiently energized, the core of said field relay being surrounded by an inductive conductor whereby the release of said field relay is delayed.

5. The combination with a dynamo comprising an armature and an electro-magnetic field, of a line relay connected in such manner that the current generated by said armature is shunted through an external circuit when said line relay is sufficiently energized, and a field relay connected with the field winding of said dynamo and arranged to decrease the resistance of the field circuit of said dynamo when said field relay is sufficiently energized, the core of said field relay being surrounded by an inductive conductor whereby the release of said field relay is delayed.

6. The combination with a dynamo comprising an armature and an electro-magnetic field, of a line relay connected in such manner that the current generated by said armature is shunted through an external circuit when said line relay is sufficiently energized, means for automatically decreasing the resistance of the field circuit of said dynamo when said armature has attained a given speed, and means tending to maintain the speed of said armature, said last named means comprising a fly wheel or other inertia member arranged to impart its motion to said armature.

In testimony whereof I affix my signature in the presence of two witnesses.

ERNEST W. DAVIS.

Witnesses:
R. J. WARREN,
J. L. MALONE.